United States Patent
Kiyofuji et al.

(10) Patent No.: US 8,087,234 B2
(45) Date of Patent: Jan. 3, 2012

(54) EXHAUST EMISSION PURIFICATION CONTROL DEVICE FOR INTERNAL COMBUSTION ENGINE

(75) Inventors: Takahiro Kiyofuji, Toyota (JP); Takenobu Yamamoto, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 311 days.

(21) Appl. No.: 12/448,273

(22) PCT Filed: Feb. 21, 2008

(86) PCT No.: PCT/JP2008/052997
§ 371 (c)(1), (2), (4) Date: Jun. 16, 2009

(87) PCT Pub. No.: WO2008/102854
PCT Pub. Date: Aug. 28, 2008

(65) Prior Publication Data
US 2010/0031636 A1    Feb. 11, 2010

(30) Foreign Application Priority Data
Feb. 21, 2007   (JP) .................................. 2007-040596

(51) Int. Cl.
*F01N 3/00*   (2006.01)
*F01N 3/10*   (2006.01)
(52) U.S. Cl. ............................... 60/285; 60/299; 60/276
(58) Field of Classification Search .................... 60/285, 60/299, 276
See application file for complete search history.

(56) References Cited

U.S. PATENT DOCUMENTS

| 2005/0028515 | A1* | 2/2005 | Fukuma et al. | 60/276 |
| 2005/0241301 | A1 | 11/2005 | Okugawa et al. | |
| 2007/0079607 | A1* | 4/2007 | Suzuki et al. | 60/299 |

FOREIGN PATENT DOCUMENTS

| JP | A-2003-148133 | 5/2003 |
| JP | A-2003-172185 | 6/2003 |
| JP | A-2005-155422 | 6/2005 |
| JP | A 2005-155422 | 6/2005 |
| JP | A-2005-181547 | 7/2005 |

(Continued)

OTHER PUBLICATIONS

Nov. 24, 2009 Office Action issued in International Application No. PCT/JP2008/058854 (translation).
International Preliminary Report on Patentability issued in International Application No. PCT/JP2008/052997.

(Continued)

*Primary Examiner* — Thomas Denion
*Assistant Examiner* — Michael Carton
(74) *Attorney, Agent, or Firm* — Oliff & Berridge, PLC

(57) ABSTRACT

An exhaust gas purification controller for controlling bed temperature of a DPF, which is arranged in an exhaust system of an internal combustion engine, at a target bed temperature by supplying fuel to the internal combustion engine. The exhaust gas purification controller includes a control unit and a transitional state detection unit. The control unit, when controlling the bed temperature of the exhaust gas purification catalyst, learns a supply amount of fuel that allows for correction of a difference between the catalyst bed temperature and the target bed temperature in the present state and reflects a learned value obtained through the learning on the supply amount of fuel. The transitional state detection unit detects a transitional state of an exhaust gas flow to the DPF. The control unit restricts the learning when the transitional state of the exhaust gas flow is detected.

6 Claims, 7 Drawing Sheets

FOREIGN PATENT DOCUMENTS

| | | |
|---|---|---|
| JP | A-2005-315198 | 11/2005 |
| JP | A-2006-291827 | 10/2006 |
| JP | A-2007-332932 | 12/2007 |
| WO | WO 2008/102854 A1 | 8/2008 |
| WO | WO 2008/140101 A1 | 11/2008 |

OTHER PUBLICATIONS

International Search Report for International Application No. PCT/JP2008/058854, issued Jun. 17, 2008.

U.S. Appl. No. 12/451,292.

* cited by examiner

EXHAUST EMISSION PURIFICATION CONTROL DEVICE FOR INTERNAL COMBUSTION ENGINE

FIELD OF THE INVENTION

The present invention relates to an exhaust gas purification controller that controls the bed temperature of an exhaust gas purification catalyst arranged in an exhaust system of an internal combustion engine by additionally supplying fuel to the engine.

BACKGROUND OF THE INVENTION

In a typical internal combustion engine such as a diesel engine mounted on a vehicle, decreases in the temperature of exhaust gas lowers the temperature of a bed for an exhaust gas purification catalyst, which is arranged in an exhaust gas passage. This adversely affects the purification functions of the exhaust gas purification catalyst. In such an internal combustion engine, when the exhaust gas temperature decreases, bed temperature control is executed to forcibly increase the exhaust gas temperature and correct the difference between the catalyst bed temperature and a target bed temperature. In the bed temperature control, the exhaust gas temperature is increased by performing post injection, in which a small amount of fuel is injected into the engine after the fuel injection that generates engine output, or by adding unburned fuel to the exhaust gas with a fuel addition valve, which is arranged in the exhaust gas passage. In the prior art, the apparatus described in patent document 1 is known as an exhaust gas purification controller that executes such bed temperature control.

In the exhaust gas purification controller described in patent document 1, correction amounts corresponding to injection amounts for post injection and addition amounts for unburned gas are stored as learned values for various ranges of the engine. The learned values are reflected in the present injection amount for post injection and the addition amount of unburned fuel. This obtains a stable temperature increasing effect with the post injection and the addition of the unburned fuel regardless of the operation state of the engine. As a result, accuracy and reliability for the control are increased when holding the catalyst bed temperature at the target bed temperature.

An exhaust gas purification apparatus that performs the so-called particulate matter (PM) regeneration for burning and eliminating PM by increasing the temperature of a diesel particulate filter (DPF), which is an exhaust gas catalyst, has the shortcomings described below.

Generally, in such an exhaust gas purification apparatus, the above-described learned values are calculated when certain conditions are satisfied, such as the PM regeneration being performed or the target bed temperature being 600 degrees or greater. A learned value is obtained by calculating the difference between the actually supplied fuel amount, which is the fuel amount supplied to the DPF from the addition valve, and an estimated supplied fuel amount, which is the fuel amount that actually contributes to the increase of the catalyst bed temperature increase. The actually supplied fuel amount and the estimated supplied fuel amount are calculated from the target bed temperature, an estimated exhaust gas temperature, which is the estimated temperature of the exhaust gas flowing through the exhaust gas passage, an estimated bed temperature, which is the estimated temperature of the DPF, and the amount of exhaust gas flowing through the exhaust gas passage. Among these factors, it is important that the estimated bed temperature and estimated exhaust gas temperature be calculated with high accuracy to learn the amount of unburned fuel added by the fuel addition valve. However, when the exhaust gas temperature and exhaust gas flow amount vary greatly, that is, when the exhaust gas temperature and exhaust gas flow amount are in a transitional state, a large difference is produced in the distribution of the exhaust gas temperature and the distribution of the catalyst bed temperature. In such a transitional state, it is difficult to form models with the exhaust gas temperature and the catalyst bed temperature. This drastically lowers the calculation accuracy of the estimated exhaust gas temperature and the estimated bed temperature. Thus, under such a situation, it is difficult to continue appropriate bed temperature control.

Such a problem is not limited to an exhaust gas purification controller that executes bed temperature control for the PM regeneration. The problem occurs regardless of whether the engine is a diesel engine or a gasoline engine and occurs in the same manner in an exhaust gas purification controller that executes control for increasing the temperature of a catalyst by adding unburned fuel to eliminate, for example, sulfur from the catalyst. Such a problem is not limited to an exhaust gas purification controller that mainly performs the addition of unburned fuel to the exhaust gas with the fuel addition valve and also occurs, for example, in an exhaust gas purification controller that controls the bed temperature of an exhaust gas catalyst based on the fuel additionally supplied to the internal combustion engine such as an exhaust gas purification controller that mainly injects fuel into the combustion chamber through post injection.

Patent Document 1: Japanese Laid-Open Patent Publication No. 2003-172185

DISCLOSURE OF THE INVENTION

It is an object of the present invention to provide an exhaust gas purification controller that performs bed temperature control in an appropriate manner based on an appropriate learned value when executing bed temperature control on an exhaust gas purification catalyst by additionally supplying fuel to an internal combustion engine.

To achieve the above object, one aspect of the present invention provides an exhaust gas purification controller for controlling bed temperature of an exhaust gas purification catalyst arranged in an exhaust system of an internal combustion engine at a target bed temperature by supplying fuel to the internal combustion engine. The exhaust gas purification controller includes a control unit and a transitional state detection unit. The control unit, when controlling the bed temperature of the exhaust gas purification catalyst, learns a supply amount of fuel that allows for correction of a difference between the catalyst bed temperature and the target bed temperature in the present state and reflects a learned value obtained through the learning of the supply amount of fuel. The transitional state detection unit detects a transitional state of an exhaust gas flow to the exhaust gas purification catalyst. The control unit restricts the learning when the transitional state of the exhaust gas flow is detected.

DETAILED DESCRIPTION OF THE PREFERRED EMBODIMENTS

One embodiment of an exhaust gas purification controller according to the present invention and applied to an exhaust gas purification controller for a diesel engine will now be discussed with reference to FIGS. 1 to 7.

Figure 1:
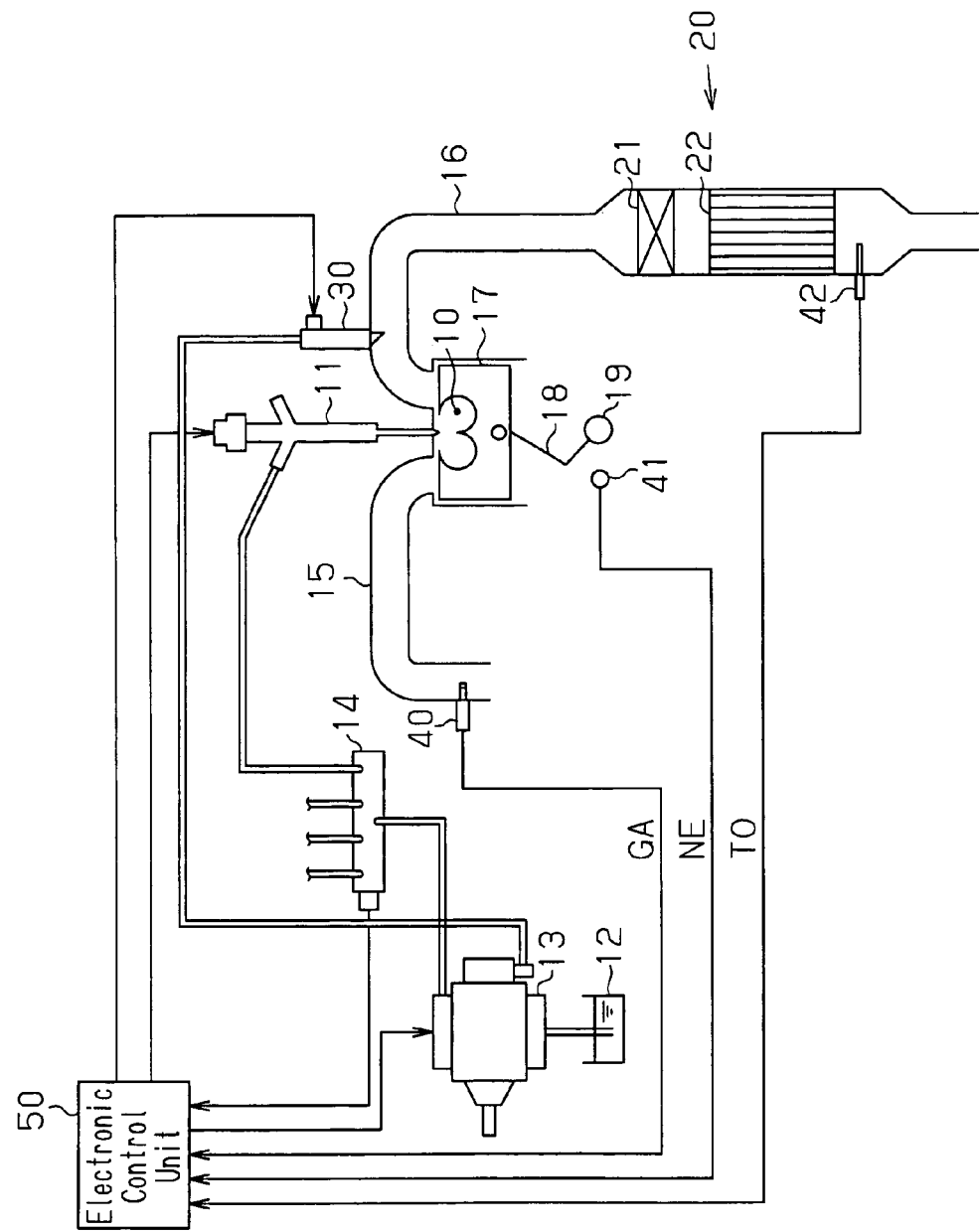
FIG. 1 is a schematic diagram showing the structure of a diesel engine to which one embodiment of an exhaust gas purification controller according to the present invention is applied.

As shown in FIG. 1, the diesel engine includes a fuel injection valve 11, which injects fuel into a combustion chamber 10. The fuel is drawn from a fuel tank 12 into a supply pump 13, and pressurized by the supply pump 13. The pressurized fuel is accumulated in a common rail 14 and then injected into the combustion chamber 10 by the fuel injection valve 11. Further, an air-fuel mixture of intake air, which is drawn from an intake passage 15, and fuel, which is injected from the fuel injection valve 11, is burned in the combustion chamber 10. Exhaust gas produced after the air-fuel mixture is burned is emitted into an exhaust passage 16. As known in the art, the combustion of the air-fuel mixture produces linear motion with a piston 17 that is converted by a connection rod 18 into rotational motion of a crankshaft 19 to produce power with the engine.

An exhaust gas purification apparatus 20 including an oxidation catalyst 21, which is used to increase the exhaust gas temperature, and a diesel particulate filter (DPF) 22, which is used to trap particulate matter (PM) suspended in the exhaust gas, is arranged in the exhaust passage 16. A fuel addition valve 30 is arranged in the exhaust passage 16 upstream to the exhaust gas purification apparatus 20. When PM deposits on the DPF 22, the fuel addition valve 30 adds unburned fuel to the exhaust gas and regenerates the DPF 22, that is, performs PM regeneration. The fuel addition valve 30 performs direct addition (injection) with fuel supplied from the supply pump 13.

The diesel engine includes various types of sensors to detect the operation state of the engine. For example, the intake passage 15 includes an airflow meter 40 for detecting the amount of air flowing through the passage 15, that is, the intake air amount. In this embodiment, the intake air amount detected by the airflow meter 40 is applied to an estimated amount of the exhaust gas flowing through the exhaust passage 16, that is, the estimated exhaust gas flow amount GA. A rotation speed sensor 41 for detecting the rotation speed of the crankshaft 19, that is, the engine speed NE, is arranged near the crankshaft 19. An exhaust gas temperature sensor 42, which detects the exhaust gas temperature TO downstream the DPF, is arranged in the exhaust passage 16 downstream the DPF 22. The sensors 40 to 42 generate output signals that are input to an electronic control unit (ECU) 50, which serves as a control unit.

The ECU 50 has a microcomputer, which includes a computation processor (CPU), a program memory (ROM), and a data memory (RAM), and centrally controls the operation of the diesel engine. The ECU 50 obtains various types of status quantities related to the operation of the diesel engine based on the output signals of the sensors 40 to 42. The ECU 50 drives the fuel injection valve 11, the supply pump 13, the fuel addition valve 30, and the like based on the status quantities to perform fuel injection amount control, which controls the fuel injection amount Q injected into the combustion chamber 10, and the PM regeneration, which maintains the purification function of the DPF 22. The PM regeneration control is control for regenerating the purification function of the DPF 22 by increasing the temperature of the DPF 22 (catalyst bed temperature) to the target bed temperature so as to burn and eliminate the PM. The PM regeneration control includes the post injection performed by the fuel injection valve 11 and the addition of unburned fuel to the exhaust gas with the fuel addition valve 30. In the engine, when PM regeneration is performed, the bed temperature of the DPF 22 is controlled at the target bed temperature by adding fuel to the exhaust gas with the fuel addition valve 30. In the control, the addition amount of the unburned fuel that corrects the difference between the present bed temperature of the DPF 22 and the target bed temperature is learned for each operation range of the engine. The learned value obtained through the learning is reflected on the addition amount of the unburned fuel.

FIGS. 2 to 5 show the procedures for adding unburned fuel to the exhaust gas with the fuel addition valve 30. Specific control schemes will now be described in detail with reference to FIGS. 2 to 5. The control or processes illustrated in FIGS. 2 to 5 are repeatedly performed in a predetermined computation cycle. The predetermined computation cycle is, for example, 0.1 to 0.2 milliseconds (ms).

Figure 2:
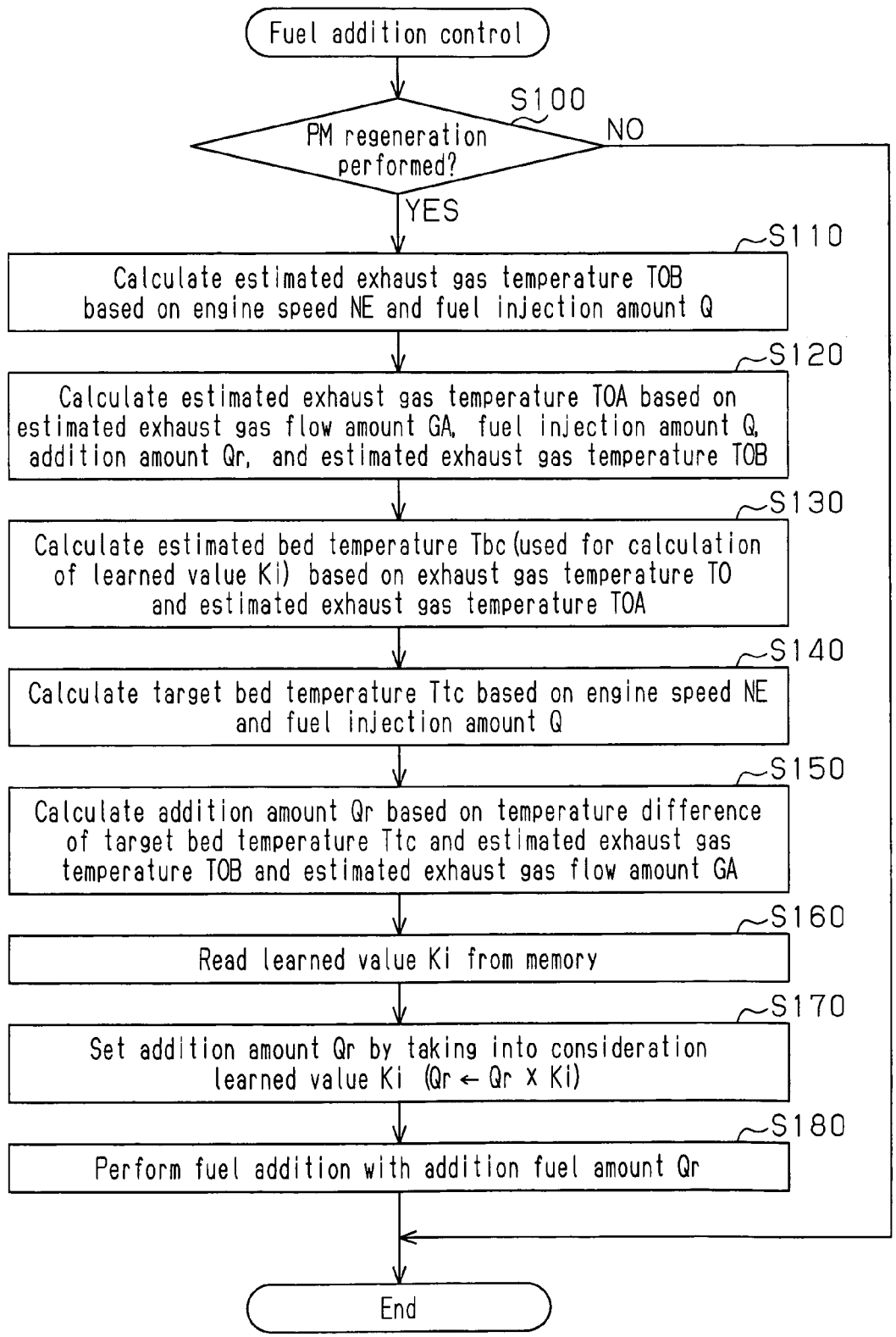
FIG. 2 is a flowchart showing the procedures of fuel addition control executed by the exhaust gas purification controller of FIG. 1.

FIG. 2 is a flowchart showing the control procedures for adding unburned fuel with the fuel addition valve 30. In this control, the addition amount Qr is calculated based on the estimated exhaust gas temperature TOB, which is the estimated value of the exhaust gas temperature, and the target bed temperature Ttc, which is the target value of the bed temperature. Further, a learned value Ki is reflected to the calculated addition amount Qr.

As shown in FIG. 2, in the fuel addition control, first, in step S100, the ECU 50 determines whether or not PM regeneration is being performed. If determined in step S100 that PM regeneration is being performed, in step S110 to step S130, the ECU 50 calculates the estimated exhaust gas temperature TOB and the estimated bed temperature Tbc. In detail, in step S110, the ECU 50 calculates the estimated exhaust gas temperature TOB in the exhaust passage 16 upstream to the DPF 22 based on the engine speed NE and the fuel injection amount Q. In step S120, the ECU 50 calculates the estimated exhaust gas temperature TOA in the exhaust passage 16 downstream to the DPF 22 based on the estimated exhaust gas temperature TOB, the fuel injection amount Q, the addition amount Qr, and the estimated exhaust gas flow amount GA. In step S130, the ECU 50 calculates the estimated bed temperature Tbc based on the estimated exhaust gas temperature TOA and the exhaust gas temperature TO, which is detected by the exhaust gas temperature sensor 42. The estimated bed temperature Tbc is used to calculate the learned value Ki.

Upon calculation of the estimated bed temperature Tbc, the ECU 50 next proceeds to step S140 and calculates the target bed temperature Ttc based on the engine speed NE and the fuel injection amount Q. In step S150, the ECU 50 calculates the temperature difference of the calculated target bed temperature Ttc and estimated exhaust gas temperature TOB. The ECU 50 also calculates the addition amount Qr of the unburned fuel based on the above-described temperature difference and the estimated exhaust gas flow amount GA.

Upon calculation of the addition amount Qr, the ECU 50 proceeds to step S160 and reads from a memory (non-volatile memory) the learned value Ki for the addition amount Qr that allows for correction of the difference between the estimated bed temperature Tbc and the target bed temperature Ttc. In step S170, the ECU 50 multiplies the additional amount Qr by the learned value Ki to set a final addition amount Qr. In step S180, the ECU 50 adds unburned fuel to the exhaust gas in correspondence with the addition amount reflecting the learned value Ki.

Figure 3:
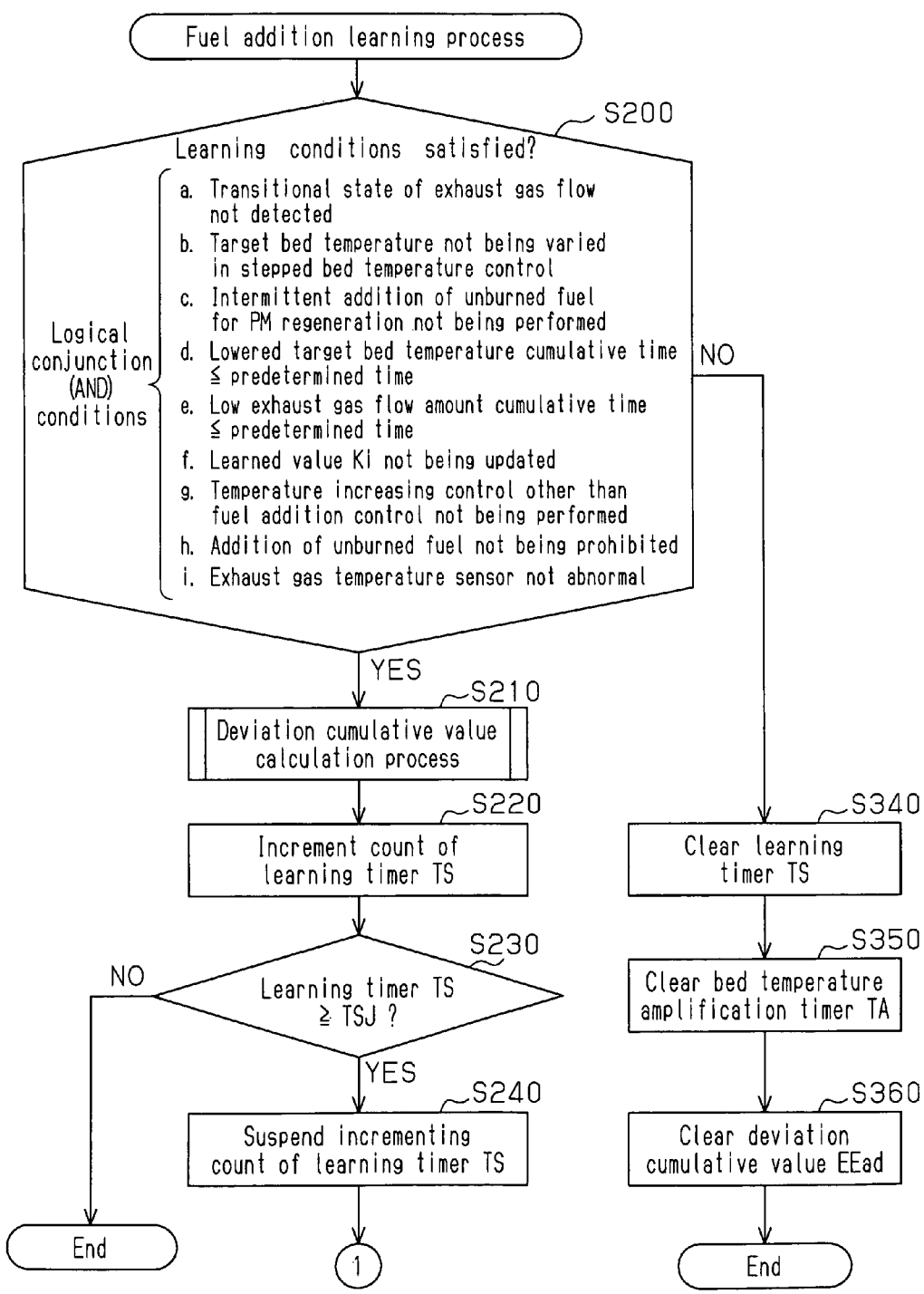
FIG. 3 is a flowchart showing the procedures of a fuel addition learning process performed by the exhaust gas purification controller of FIG. 1.

In this embodiment, the ECU 50 performs, separately from the fuel addition control described above, a fuel addition learning process shown in FIG. 3 to periodically update the learned value Ki in accordance with the engine operation state.

More specifically, in the fuel addition learning process, as shown in FIG. 3, in step S200, the ECU 50 determines whether or not conditions for performing learning are satisfied. The learning conditions are, for example, a logical conjunction (AND) of following conditions a) to i):

a) a transitional state of exhaust gas flowing through the DPF is not detected;

b) the target bed temperature Ttc is not being varied in a stepped bed temperature control, which varies the target bed temperature Ttc in a stepped manner in accordance with the amount of PM deposited on the DPF 22;

c) intermittent addition of unburned fuel, which is for PM regeneration that burns and eliminates the PM deposited on the DPF 22, is not being performed;

d) the cumulative time of the time during which the target bed temperature Ttc is less than or equal to a low temperature determination value is not greater than or equal to a predetermined time during a period in which the transitional state of the flow of exhaust gas is detected;

e) the cumulative time of the time during which the estimated exhaust gas flow amount GA is less than or equal to a low amount determination value is not greater than or equal to a predetermined time during a period in which the transitional state of the flow of exhaust gas is detected;

f) the learned value Ki is not being updated in the fuel addition learning process;

g) control for increasing the temperature of the DPF 22 with a device other than the fuel addition valve 30 is not being performed, such as post injection with the fuel injection valve 11;

h) addition of unburned fuel with the fuel addition valve 30 is not prohibited; and i) the exhaust gas temperature sensor 42 is not abnormal.

With regard to condition a), it is difficult to perform learning when the flow of exhaust gas is in a transitional state.

With regard to condition b), in an exhaust gas purification control that performs PM regeneration, when a large amount of PM is deposited on the DPF 22 and some of the PM is burned, this may ignite the remaining PM and thereby burn all of the deposited PM. Thus, the catalyst temperature is apt to increase. In other words, the target bed temperature Ttc when performing PM regeneration may be set at a low temperature (e.g., 600° C.). When the amount of PM deposited on the DPF is small, even if some of the PM is burned, this would not burn all of the deposited PM. That is, the target bed temperature Ttc must be set to a high temperature such as 630° C. Control for varying the target bed temperature Ttc in a stepped manner in accordance with the amount of PM deposited on the DPF in this manner is referred to as stepped temperature increase control. When the target bed temperature Ttc is varied in the stepped temperature increase control, the exhaust gas temperature is varied in accordance with the target bed temperature Ttc, that is, the exhaust gas temperature being in a transitional state. Thus, it is difficult to perform learning.

With regard to condition c), intermittent addition of unburned fuel refers to control for completely burning and eliminating the PM deposited on the DPF 22 by adding unburned fuel to the exhaust gas in an injection pattern differing from an injection pattern that is based on the addition amount Qr of the fuel addition control. When performing intermittent addition of unburned fuel, it cannot be determined whether a change in the exhaust gas temperature or the temperature of the DPF 22 is caused by the addition of unburned fuel from the fuel addition valve 30 or the intermittent addition of unburned fuel. Thus, it is difficult to perform learning.

With regard to condition d), when a state continues in which the target bed temperature Ttc is less than or equal to the low temperature determination value, the actual temperature of the DPF 22 may also be less than or equal to the low temperature determination value and thereby lower the calculation accuracy of the estimated bed temperature Tbc. Thus, it is difficult to perform learning.

With regard to condition e), when a state continues in which the estimated exhaust gas flow amount GA is less than or equal to the low amount determination value, the calculation accuracy of the estimated exhaust gas temperature TOB decreases. Accordingly, it is difficult to perform learning.

With regard to condition f), when the learned value Ki is updated, the addition amount of the unburned fuel from the fuel addition valve 30 varies and the exhaust gas temperature shifts to a transitional state. Thus, it is difficult to perform learning.

With regard to condition g), the temperature of the DPF 22 may be increased with a device other than the fuel addition valve 30 such as the fuel injection valve 11 that performs post injection. In such a case, it cannot be determined whether a change in the exhaust gas temperature or temperature of the DPF 22 is caused by the addition of unburned fuel with the fuel addition valve 30 or by the second device. Thus, it is difficult to perform learning.

With regard to condition h), when the addition of unburned fuel with the fuel addition valve 30 is prohibited by another device, it is difficult to perform learning.

With regard to condition i), the exhaust gas purification controller performs the learning based on the exhaust gas temperature TO detected by the exhaust gas temperature sensor 42, which is arranged in the exhaust passage 16 of the diesel engine. Accordingly, when the exhaust gas temperature sensor 42 is abnormal, it is difficult to perform learning.

In step S200, the ECU 50 determines whether or not conditions a) to i) are all satisfied. When any one of the conditions is not satisfied, the processing is terminated without calculating the learned value Ki. This obtains the correct learned value Ki. Particularly, in this embodiment, when condition a) is not satisfied, the ECU 50 restricts the learning of the addition amount for the unburned fuel.

Condition a) is determined based on the energy of the exhaust gas flowing through the exhaust passage 16, namely, a deviation cumulative value EEad, which is the cumulative value of deviation between an average exhaust gas energy, which is an average value of the exhaust gas energy, and a momentary exhaust gas energy, which is a momentary value of the exhaust gas energy. A transitional state of the flow of exhaust gas is detected when the deviation cumulative value EEad is greater than or equal to a transitional state determination value EEadj. The use of the deviation cumulative value EEad is effective for detecting the transitional state in the flow of exhaust gas. Further, by detecting a transitional state in the flow of exhaust gas when the cumulative value EEad is greater than or equal to the determination value EEadj, a transitional state may easily be detected with high accuracy. The process of step S200 (more precisely, the process for determining whether or not condition a) is satisfied) is performed by a transitional state detection unit. The cumulative value EEad is maintained at "0" until the logical conjunction condition for the above conditions b) to i) is satisfied. When condition a) is satisfied and the logical conjunction condition for the above conditions b) to i) is satisfied thereby satisfying the conditions for performing learning, the ECU 50 proceeds to step S210.

In step 210, the ECU 50 calculates the deviation cumulative value EEad. The deviation cumulative value EEad is calculated from a momentary exhaust gas energy EEm and an average exhaust gas energy EEa in a deviation cumulative value calculation process illustrated in FIG. 5.

Figure 5:
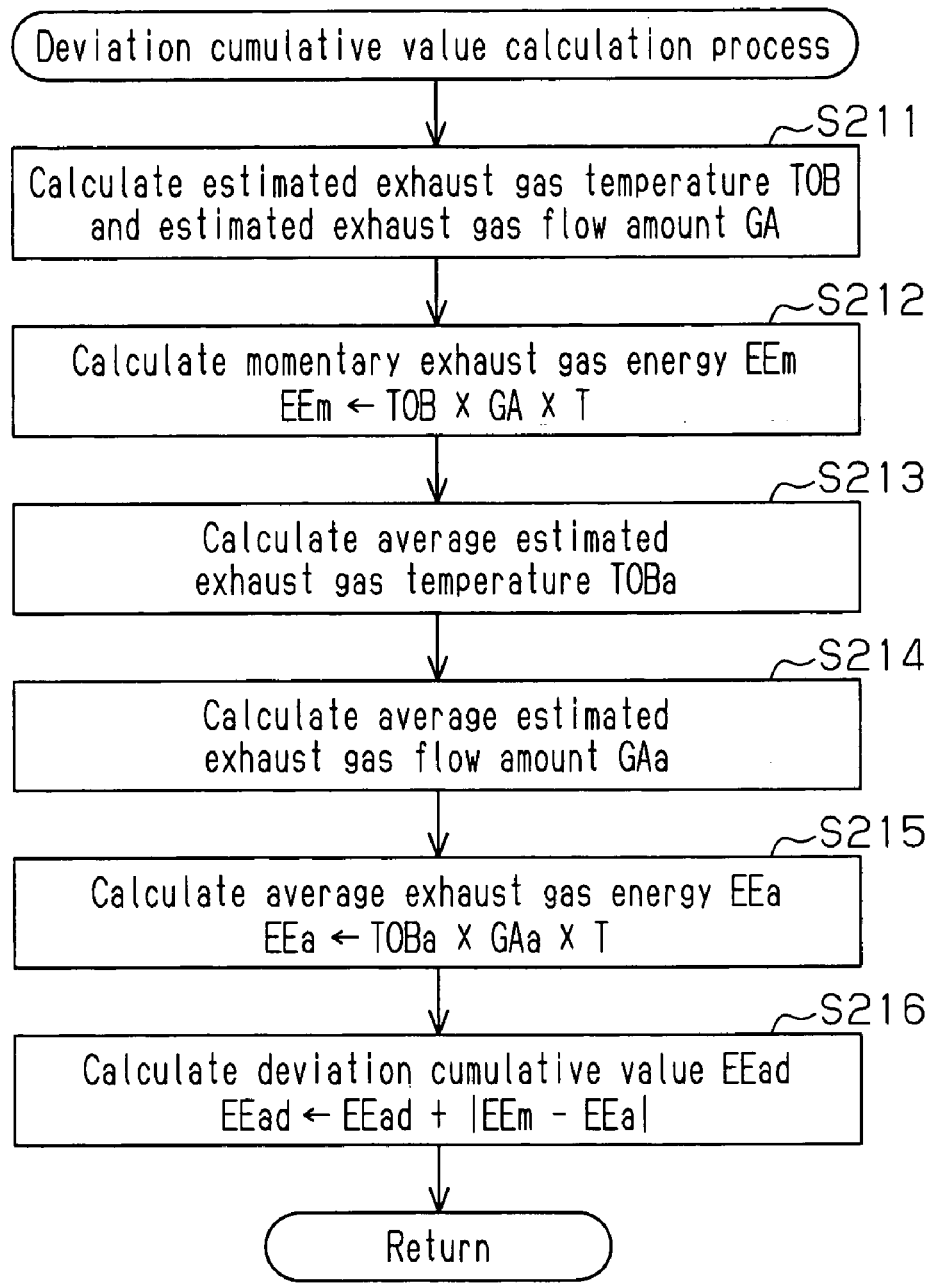
FIG. 5 is a flowchart showing the procedures of a deviation cumulative value calculation process performed when the fuel addition learning process of FIGS. 3 and 4 are performed.
Figure 6:
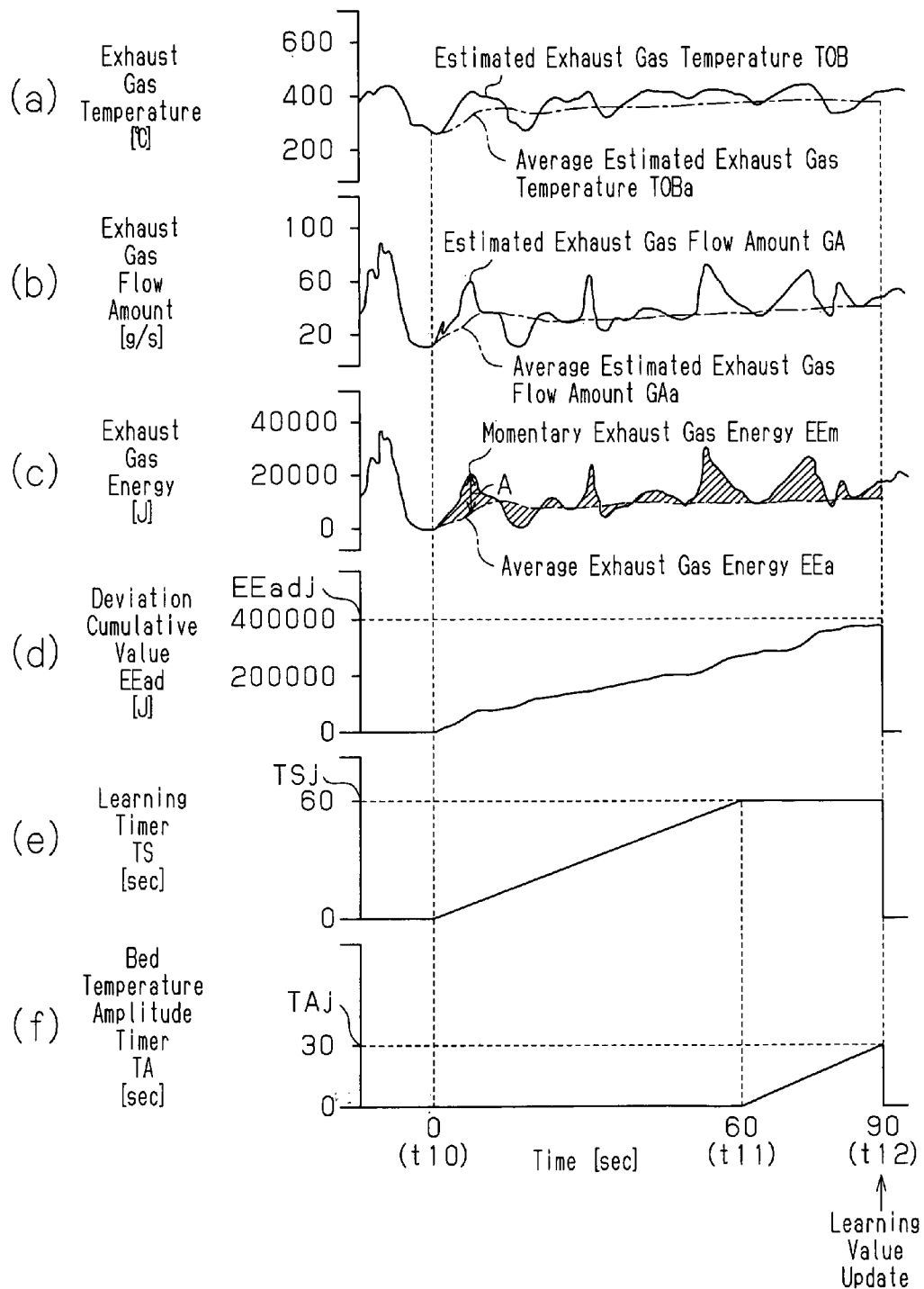
FIGS. 6(a) to 6(f) are timing charts taken from when the conditions for executing the fuel addition learning are satisfied and showing the transition of each of an estimated exhaust gas temperature TOB, average estimated exhaust gas temperature TOBa, estimated exhaust gas flow amount GA, average estimated exhaust gas flow amount GAa, momentary exhaust gas energy EEm, average exhaust gas energy EEa, deviation cumulative value EEad, learning timer TS, and bed temperature amplitude timer TA.
Figure 7:
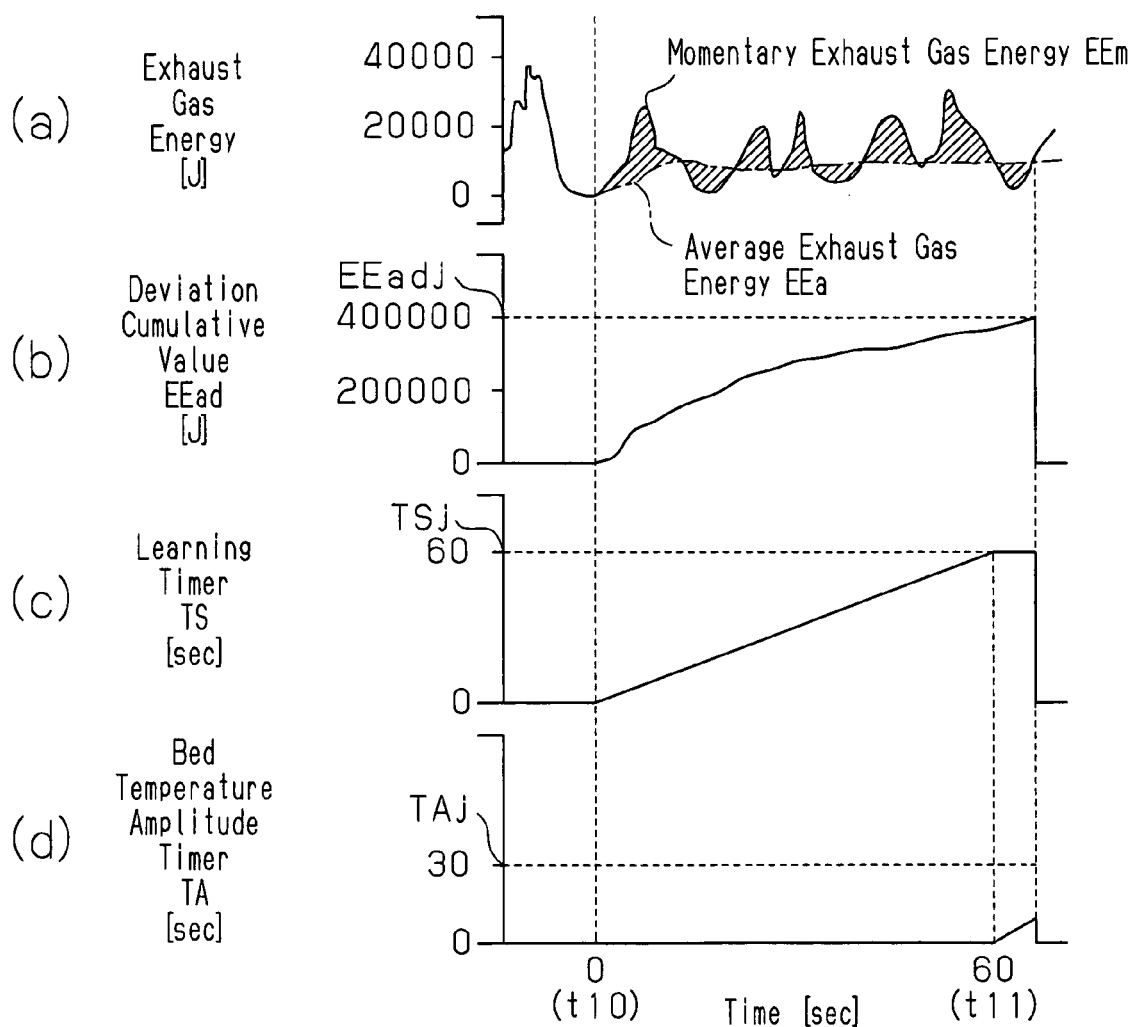
FIGS. 7(a) to 7(d) are timing charts taken from when the conditions for executing the fuel addition learning are satisfied and showing the transition of each of the momentary exhaust gas energy EEm, average exhaust gas energy EEa, deviation cumulative value EEad, learning timer TS, and bed temperature amplitude timer TA.

Referring to FIG. 5, first in the deviation cumulative calculation process, in step S211, the ECU 50 detects the estimated exhaust gas temperature TOB and the estimated exhaust gas flow amount GA in the exhaust passage 16 upstream the DPF 22. In step S211, the ECU 50 calculates the momentary exhaust gas energy EEm from the estimated exhaust gas temperature TOB, the estimated exhaust gas flow amount GA, and the computation cycle T of this process using equation (1), which is shown below. As described above, the computation cycle is set to values of about 0.1 to 0.2 ms.

$$EEm \leftarrow TOB \times GA \times T \qquad (1)$$

Then, in step S213, to calculate the average exhaust gas energy EEa, the ECU 50 calculates an average estimated exhaust gas temperature TOBa, which is the average value of the estimated exhaust gas temperature TOB from when the conditions for performing learning is satisfied to the present time. FIG. 6(a) shows changes over time of the estimated exhaust gas temperature TOB and the average estimated exhaust gas temperature TOBa. The average estimated exhaust gas temperature TOBa is sequentially calculated based on the present estimated exhaust gas temperature TOB from time t10 at which the conditions for performing learning are satisfied. Subsequently, in step S214, the ECU 50 calculates the average estimated exhaust gas flow amount GAa, which is the average value of the estimated exhaust gas flow amount GA from time t10. FIG. 6(b) shows changes over time in the estimated exhaust gas flow amount GA and the average estimated exhaust gas flow amount GAa from time t10. The average estimated exhaust gas flow amount GAa is sequentially calculated from time t10 based on the present estimated exhaust gas flow amount GA. In step S215, the ECU 50 calculates the average exhaust gas energy EEa from the calculated average estimated exhaust gas temperature TOBa, the average estimated exhaust gas flow amount GAa, and the computation cycle T of this process using equation (2), which is shown below.

$$EEa \leftarrow TOBa \times GAa \times T \qquad (2)$$

The momentary exhaust gas energy EEm and the average exhaust gas energy EEa are calculated using equations (1) and (2). As a result, the computation load on the ECU 50 is minimized when obtaining the deviation cumulative value EEad, which will be described next.

In step S216, the ECU 50 calculates the deviation cumulative value EEad from the momentary exhaust gas energy EEm and the average exhaust gas energy EEa using equation (3), which is shown below.

$$EEad_{(i)} \leftarrow EEad_{(i-1)} + |EEm_{(i)} - EEa_{(i)}| \qquad (3)$$

(i): present value
(i−1): previous value

FIG. 6(c) shows changes over time in the momentary exhaust gas energy EEm and the average exhaust gas energy EEa. As shown in FIG. 6(c), from time t10, the calculation of the average exhaust gas energy EEa is started and the calculation of the deviation between the average exhaust gas energy EEa and the momentary exhaust gas energy EEm is started. The deviation is the value that corresponds to the range indicated by arrow A in FIG. 6(c). Further, the cumulative value of the deviation value (deviation cumulative value EEad), that is, the area of the potion shown by diagonal lines in FIG. 6(c), in the present state is calculated. As shown in FIG. 6(d), the deviation cumulative value EEad increases as time elapses.

After the deviation cumulative value EEad is calculated, in step S220 of FIG. 3, a learning timer TS increments its count. In step S230, it is determined whether or not the value of the learning timer TS is greater than or equal to a learning timer determination value TSj. The learning timer determination value TSj is, for example, 60 seconds. FIG. 6(e) shows changes over time in the value of the learning timer TS. The learning timer TS starts incrementing its count at time t10, and the count increases until reaching the learning timer determination value TSj. The learning timer determination value TSj is preset as a value that allows determination of the temperature of the DPF 22 to the vicinity of the target bed temperature when the period corresponding to the determination value TSj elapses even if the target bed temperature Ttc is varied immediately before time t10 by a control that greatly varies the temperature of the DPF 22 such as the step temperature increase control. In other words, in this embodiment, the temperature of the DPF is estimated based on the estimated bed temperature Tbc. Thus, it is difficult to accurately determine whether or not the temperature of the DPF 22 is in a stable state when performing the addition amount learning for the unburned fuel without measuring the actual temperature of the DPF 22. For this reason, in the process of step S230 of FIG. 3, the value of the learning timer TS and the learning timer determination value TSj are used to determine whether or not the temperature of the DPF 22 is in a stable state for performing the learning.

When determined in step S230 that the value of the learning timer TS is greater than or equal to the learning timer determination value TSj, in step S240, the incrementing of the count of the timer TS is suspended. As shown in FIG. 6(e), from time t11 at which the value of the learning timer TS reaches the learning timer determination value TSj, the value of the timer TS is maintained at the determination value TSj. Afterwards, the determination of whether or not the temperature of the DPF 22 is appropriate for performing learning of the addition amount of the unburned fuel is determined based on the difference of the maximum value and minimum value of the estimated bed temperature Tbc, that is, a bed temperature amplitude maximum value ATCmax, which is the maximum value of bed temperature amplitudes ATC.

Figure 4:
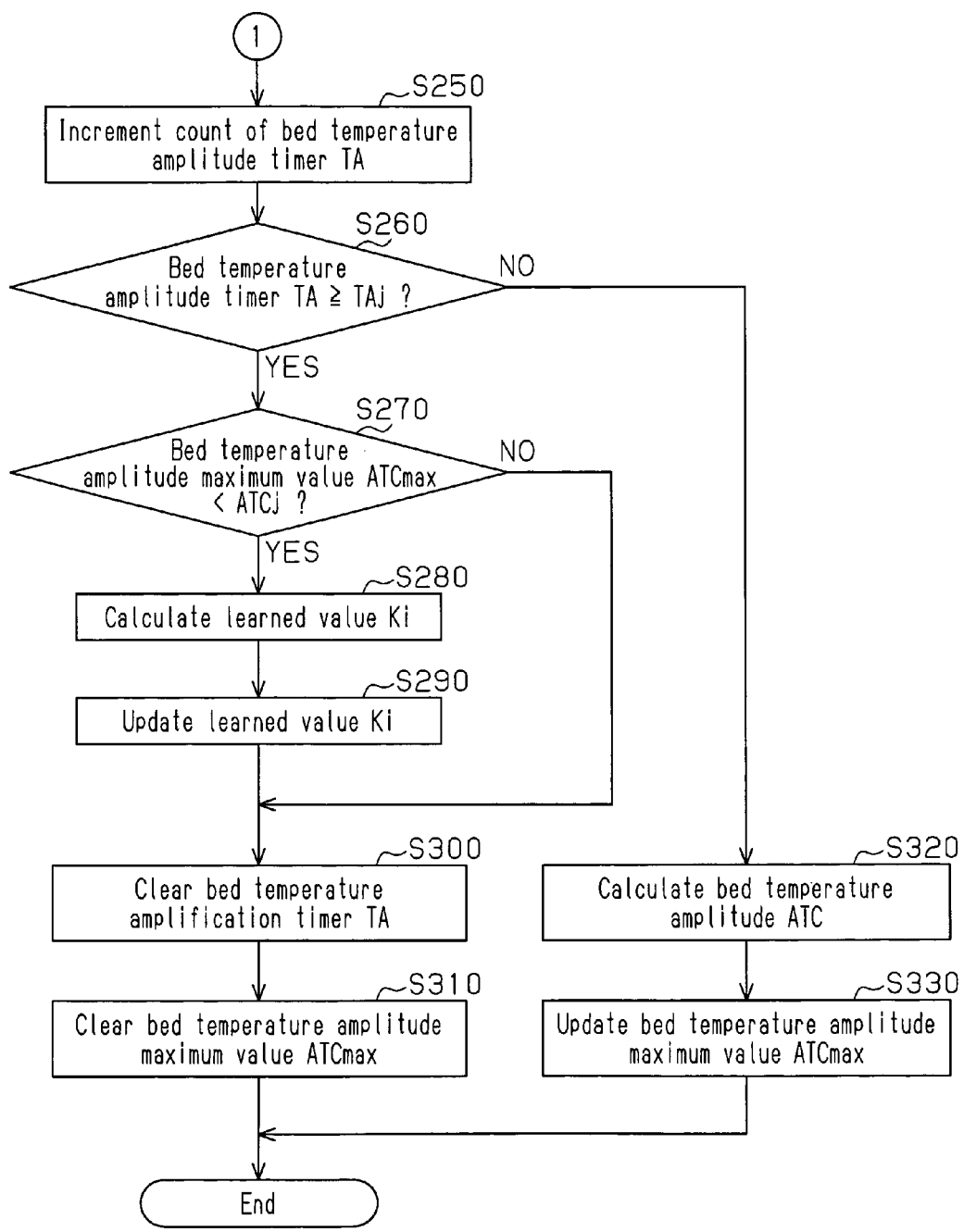
FIG. 4 is a flowchart showing the procedures of a fuel addition learning process performed by the exhaust gas purification controller of FIG. 1.

Referring to FIG. 4, first in the fuel addition learning process, in step S250, the ECU 50 starts incrementing the count of a bed temperature amplitude timer TA to calculate the bed temperature amplitude ATC. In step S260, the ECU 50 determines whether or not the value of the bed temperature amplitude timer TA is greater than or equal to a bed temperature amplitude timer determination value TAj (e.g., 30 sec). When determined that the bed temperature amplitude timer TA is still less than the bed temperature amplitude timer determination value TAj, in step S320, the ECU 50 calculates the present bed temperature amplitude ATC in each time. In step S330, when the value of the calculated bed temperature amplitude ATC is greater than a value previously stored in a suitable memory, the ECU 50 updates a bed temperature amplitude maximum value ATCmax with the value of the calculated bed temperature amplitude ATC. Afterwards, when the value of the bed temperature amplitude timer TA becomes greater than or equal to the bed temperature amplitude timer determination value TAj in step S260, the ECU 50 proceeds to step S270 and determines whether or not the value of the bed temperature amplitude maximum value ATCmax is less than an amplitude determination value ATCj. Through the process of step S270, the ECU 50 determines whether or not the temperature of the DPF 22 is appropriate for performing learning of the addition amount of the unburned fuel. FIG. 6(f) shows changes over time of the value of the bed temperature amplitude timer TA. The bed temperature amplitude timer TA starts incrementing its count from time t11, which is when the value of the timer TS reaches the learning timer determination value TSj. The bed temperature amplitude maximum value ATCmax is calculated in correspondence with the incrementing of the count of the bed temperature amplitude timer TA. At time t12 when the value of the bed temperature amplitude timer TA reaches the amplitude determination value ATCj, the ECU 50 determines whether or not the value of the updated bed temperature amplitude maximum value ATCmax is less than the amplitude determination value ATCj.

When determined that the bed temperature maximum value ATCmax is less than the amplitude determination value ATCj in step S270, the ECU 50 proceeds to step S280 and calculates a learned value Ki. To calculate the learned value Ki, a required heat value CVD and estimated heat value CVP are calculated using equations (4) and (5), which are shown below. Then, the required heat value CVD and estimated heat value CVP are used in equation (6), which is shown below. Conversion coefficient k is used for conversion of the heat value from the increase width of the temperature of the DPF 22.

$$CVD \leftarrow (Ttc-TOB) \times GA \times k \quad (4)$$

$$CVP \leftarrow (Tbc-TOB) \times GA \times k \quad (5)$$

$$Ki_{(i)} \leftarrow (CVD-CVP)/CVP \times Ki_{(i-1)}+1 \quad (6)$$

(i): present value
(i−1): previous value

In step S290, the learned value Ki calculated as described above newly updates the learned value Ki. More specifically, as shown in FIG. 6(f), at time t12 when the value of the bed temperature amplitude timer TA reaches the bed temperature amplitude timer determination value TAj, if determined that the bed temperature amplitude maximum value ATCmax is less than the amplitude determination value ATCj, the ECU 50 calculates and updates the learned value Ki and performs learning of the addition amount of the unburned fuel. After the process of step S290, in steps S300 and S310, the bed temperature amplitude timer TA and the bed temperature amplitude maximum value ATCmax are both cleared. Then, the processing is suspended.

When determined that the bed temperature maximum value ATCmax is greater than or equal to the amplitude determination value ATCj in step S270, without performing the calculation and updating of the learned value Ki, the bed temperature amplitude timer TA and the bed temperature amplitude maximum value ATCmax are both cleared. Then, in step S270 of the next fuel addition learning process, the ECU 50 determines again whether or not the bed temperature amplitude maximum value ATCmax is less than the amplitude determination value ATCj. That is, the bed temperature amplitude ATC and bed temperature amplitude maximum value ATCmax are repeatedly calculated until the bed temperature amplitude maximum value ATCmax becomes less than the amplitude determination value ATCj. Further, learning is performed when the bed temperature amplitude maximum value ATCmax becomes less than the amplitude determination value ATCj.

Even if incrementing of the count of the learning timer TS or bed temperature amplitude timer TA is started, when the logical conjunction conditions, which are the conditions for performing learning, become unsatisfied in step S200 of FIG. 3, the ECU 50 clears the timers TS and TA in steps S340 and S350. In step S360, the ECU 50 clears the deviation cumulative value EEad and restricts (prohibits) the learning. Especially, in this embodiment, as shown in FIG. 6(d), during the period of time t10 to t12 until when the timers TS and TA respectively increment their counts to the determination values TSj and TAj, the learning is performed when at least the deviation cumulative value EEad is less than the transitional state determination value EEadj, that is, when a transitional state of the exhaust gas flow is not detected. When the deviation of the momentary exhaust gas energy EEm and the average exhaust gas energy EEa is large as shown in FIG. 7(a), the increase rate of the deviation cumulative value EEad increases accordingly as shown in FIG. 7(b). In this state, after the value of the learning timer TS reaches the learning timer determination value TSj in the manner shown in FIG. 7(c), when the deviation cumulative value EEad reaches the transitional state determination value EEadj before the value of the bed temperature amplitude timer TA reaches the amplitude determination value ATCj in the manner shown in FIG. 7(d), that is, when the transitional state of the exhaust gas flow is detected, the ECU 50 gives a negative determination in step S200 of FIG. 3. Accordingly, learning is not performed. In this embodiment, the learning is restricted when the transitional state of the exhaust gas flow is detected. This prevents erroneous learning in which the learned value takes an excessively high or excessively low value for the temperature of the DPF 22. This allows for the bed temperature control to be continued in a further appropriate manner based on a further appropriate learned value Ki.

As described above, the exhaust gas purification controller for an internal combustion engine in this embodiment has the advantages described below.

(1) When a transitional state of the exhaust gas flow is detected, that is, when the condition a), which is one of the conditions for performing learning, is not satisfied, the learning of the addition amount of the unburned fuel is restricted. This prevents erroneous learning in which the learned value Ki takes an excessively high or excessively low value for the temperature of the DPF 22. This allows for the bed temperature control to be continued in a further appropriate manner based on a further appropriate learned value Ki.

(2) To detect a transitional state of the exhaust gas flow, the deviation cumulative value EEad, which is the cumulative value of the deviation of the average exhaust gas energy EEa, which is an average value of the exhaust-gas energy obtained from the estimated exhaust gas temperature TOB and the estimated exhaust gas flow amount GA, and the momentary exhaust gas energy EEm, which is a momentary value of the exhaust gas energy, is used. The use of the cumulative value EEad is effective for detection of the exhaust gas flow. A transitional state of the exhaust gas flow is detected when the cumulative value EEad becomes greater than or equal to the determination value EEadj. Thus, a transitional state may easily be determined with high accuracy.

(3) The average exhaust gas energy EEa is calculated from when the conditions for performing the learning are satisfied as the product of average values for each of the estimated exhaust gas temperature TOB and the estimated exhaust gas flow amount GA in the present state. Further, the momentary exhaust gas energy EEm is calculated from when the conditions for performing the learning are satisfied as the product of the estimated exhaust gas temperature TOB and the estimated exhaust gas flow amount GA in the present state. This minimizes the computation load on the ECU 50 for obtaining the deviation cumulative value EEad.

(4) When the conditions for performing learning, that is, when any one of conditions a) to i) is unsatisfied, the learning of the addition amount of the unburned fuel is restricted. This allows for a further appropriate value to be obtained as the learned value Ki.

The above-described embodiment may be modified and performed in the forms described below.

In the above-described embodiment, the transitional state of the exhaust gas flow is detected based on the cumulative value EEad of the deviation of the average exhaust gas energy EEa and the momentary exhaust gas energy EEm. Instead, for example, the deviation of the maximum value and minimum value of the momentary exhaust gas energy EEm may be detected, and a transitional state of the exhaust gas flow may be detected when the deviation becomes greater than or equal to a predetermined determination value.

In the above-described embodiment, the conditions for performing learning include condition a), that is, a transitional state of the exhaust gas flow not being detected, and a logical conjunction of conditions b) to i). Instead, the conditions for performing learning may be, for example, a logical conjunction of conditions a) to h) or a logical conjunction of conditions a) to f). It is only required that the conditions for performing learning include at least a transitional state of the exhaust gas flow not being detected.

In the above-described embodiment, the temperature of the DPF 22, the exhaust gas flow amount, and the like are estimated using the estimated bed temperature Tbc and the estimated exhaust gas flow amount GA. However, the temperature of the DPF 22, the exhaust gas flow amount, and the like may be actually detected.

In the above-described embodiment, the exhaust gas purification controller, in which the bed temperature control is executed for the PM regeneration is exemplified. However, the present invention may be applied to an exhaust gas purification controller that executes control for increasing the temperature of a catalyst by adding unburned fuel to eliminate, for example, sulfur adhered to the catalyst. Further, the exhaust gas purification control may be intended for engines including a diesel engine and gasoline engine.

In the above-described embodiment, the bed temperature control for an exhaust purification catalyst that mainly uses the fuel addition valve 30, which is arranged in the exhaust system is exemplified. However, the present invention may be applied to bed temperature control that mainly uses post injection into a combustion chamber of an internal combustion engine. The present invention may be applied to any exhaust gas purification controller that controls the bed temperature of an exhaust gas catalyst with an additional supply of fuel to an internal combustion engine.

The invention claimed is:

1. An exhaust gas purification controller for controlling bed temperature of an exhaust gas purification catalyst arranged in an exhaust system of an internal combustion engine at a target bed temperature by supplying fuel to the internal combustion engine, the exhaust gas purification controller comprising:
　a control unit which is programmed to learn a supply amount of fuel that allows for a correction of a difference between the catalyst bed temperature and the target bed temperature in the present state and is programmed to reflect a learned value obtained through the learning on the supply amount of when controlling the bed temperature of the exhaust gas purification catalyst:
　a transitional state detection unit which is programmed to detect a transitional state of an exhaust gas flow to the exhaust gas purification catalyst, wherein the control unit is programmed to restrict the learning when the transitional state of the exhaust gas flow is detected; and
　wherein based on a temperature and flow amount of exhaust gas to the exhaust gas purification catalyst, the transitional state detection unit is programmed to obtain an average exhaust gas energy, which is an average value of exhaust gas energy, momentary exhaust gas energy, which is a momentary value of exhaust gas energy, and a cumulative value of a deviation of the average exhaust gas energy and the momentary exhaust gas energy; and
　the transitional state detection unit is programmed to detect a transitional state of the exhaust gas flow when the cumulative value of the deviation becomes greater than or equal to a predetermined determination value.

2. The exhaust gas purification controller according to claim 1, wherein:
　the average exhaust gas energy is calculated as a product of average values for each of the exhaust gas temperature and the exhaust gas flow amount that are obtained when conditions for performing the learning are satisfied to the present state; and
　the momentary exhaust gas energy is calculated as a product of the exhaust gas temperature and the exhaust gas flow amount that are obtained when the conditions for performing the learning are satisfied to the present state.

3. The exhaust gas purification controller according to claim 2, wherein:
　the internal combustion engine is a diesel engine;
　the exhaust gas purification catalyst includes a diesel particulate filter (DPF) which traps particulate matter (PM) suspended in the exhaust gas; and
　the conditions for performing the learning are at least a logical conjunction of following conditions a) to f):
　a) a transitional state of the exhaust gas flow is not detected by the transitional state detection unit;
　b) the target bed temperature is not being varied in a stepped bed temperature control, which varies the target bed temperature in a stepped manner in accordance with the amount of PM deposited on the DPF;
　c) an intermittent addition of the fuel, which is for DPF regeneration that burns and eliminates the PM deposited on the DPF, is not being performed;

d) a cumulative time of a time during which the target bed temperature is less than or equal to a low temperature determination value is not greater than or equal to a predetermined time during a detection period of the transitional state detection unit;

e) a cumulative time of a time during which the exhaust gas flow amount is less than or equal to a low amount determination value is not greater than or equal to a predetermined time during the detection period of the transitional state detection unit; and f) the learned value is not being updated.

4. The exhaust gas purification controller according to claim 3, further comprising:

a fuel addition valve arranged in the exhaust system which adds unburned fuel to the exhaust gas so as to control the bed temperature of the exhaust gas catalyst; and a device other than the fuel addition valve which controls the bed temperature of the exhaust gas purification catalyst;

wherein the conditions of the logical conjunction for performing the learning further includes following conditions g) and h):

g) a control for increasing the catalyst bed temperature with the other device is not being performed; and h) the addition of unburned fuel with the fuel addition valve is not prohibited.

5. The exhaust gas purification controller according to claim 3, further comprising:

an exhaust gas temperature sensor arranged in the exhaust system, wherein the control unit performs the learning based on the an exhaust gas temperature detected by the exhaust gas temperature sensor, and the conditions of the logical conjunction for performing the learning further includes following condition i):

i) the exhaust gas temperature sensor is not abnormal.

6. The exhaust gas purification controller according to claim 4, further comprising:

an exhaust gas temperature sensor arranged in the exhaust system, wherein the control unit is programmed to perform the learning based on an exhaust gas temperature detected by the exhaust gas temperature sensor, and the conditions of the logical conjunction for performing the learning further includes following condition i):

i) the exhaust gas temperature sensor is not abnormal.

* * * * *